United States Patent [19]

Mack et al.

[11] Patent Number: 5,059,032
[45] Date of Patent: * Oct. 22, 1991

[54] FREE STANDING FLUXMETER FIXTURE WITH DUAL INFRARED PYROMETERS

[75] Inventors: Russel T. Mack, Lake Jackson; Ronald W. Rieger, Waco, both of Tex.

[73] Assignee: The Dow Chemical Company, Midland, Mich.

[ * ] Notice: The portion of the term of this patent subsequent to Jun. 19, 2007 has been disclaimed.

[21] Appl. No.: 569,108

[22] Filed: Aug. 16, 1990

[51] Int. Cl.[5] .................. G01K 17/00; G01K 7/00; G01J 5/10

[52] U.S. Cl. .................................. 374/29; 374/133; 374/121; 374/208; 374/143; 136/221; 136/230

[58] Field of Search .................. 374/10, 12, 13, 29, 374/30, 43, 133, 142, 143, 208, 210, 129, 130, 132; 136/221, 230; 356/43; 250/338.1

[56] References Cited

U.S. PATENT DOCUMENTS

| | | | |
|---|---|---|---|
| 1,528,383 | 3/1925 | Schmidt | 374/30 |
| 1,977,340 | 10/1934 | King | 73/32 |
| 3,282,107 | 7/1974 | Sumikawa et al. | 73/190 |
| 3,526,123 | 9/1970 | Putman et al. | 73/15 |
| 3,715,923 | 2/1973 | Hornbaker | 374/30 |
| 3,821,895 | 11/1976 | Ekstrom, Jr. | 73/355 |
| 4,123,938 | 11/1978 | Hamilton | 374/29 |
| 4,265,117 | 5/1981 | Thoma et al. | 73/359 |
| 4,396,791 | 8/1983 | Mazzoni | 136/221 |
| 4,527,908 | 7/1985 | Arisi | 374/147 |
| 4,553,852 | 11/1985 | Derderian et al. | 374/1 |
| 4,555,764 | 11/1985 | Kuehn | 374/30 |
| 4,589,781 | 5/1986 | Mack | 374/29 |
| 4,621,615 | 11/1986 | McGee | 374/30 |
| 4,793,553 | 12/1988 | Berman | 374/29 |
| 4,831,258 | 5/1989 | Paulk et al. | 250/349 |
| 4,896,281 | 1/1990 | Mack | 364/557 |
| 4,906,105 | 3/1990 | Geake | 374/30 |
| 4,944,035 | 7/1990 | Aagardl et al. | 374/30 |

OTHER PUBLICATIONS

Russel T. Mack, *Energy Loss Profiles: Foundation for Future Profit in Thermal Imager Sales and Service*, Fifth Infrared Information Exchange (Book 1); Oct. 29-31, 1985.

ASTM Designation: C680-82, Standard Practice for Determination of Heat Gain or Loss and the Surface Temperatures of Insulated Pipe and Equipment Systems by the Use of a Computer Program, Jul., 1984; pp. 270-277, and pp. 302, 306 and 318.

*Primary Examiner*—William A. Cuchlinski, Jr.
*Assistant Examiner*—Diego F. F. Gutierrez

[57] ABSTRACT

An apparatus for measuring heat flow from a surface, including a heat flow measuring device for measuring heat flow from a surface; a structure for applying a relatively constant and repeatable force on the heat flow measuring device contacting the surface; an infrared pyrometer for measuring test surface temperature; an infrared pyrometer for measuring surrounding atmospheric temperature and a free standing support for supporting all of the above identified elements of the heat flow measuring device.

28 Claims, 5 Drawing Sheets

FREE STANDING FLUXMETER FIXTURE WITH DUAL INFRARED PYROMETERS

CROSS-REFERENCES TO OTHER APPLICATIONS

This application contains subject matter common to Ser. No. 346,848, now U.S. Pat. No. 4,934,830, filed May 3, 1989, which is a division of Ser. No. 243,361, now U.S. Pat. No. 4,870,656, filed Sept. 12, 1988. This application also contains subject matter common to U.S. Pat. No. 4,896,281. All of the afore-mentioned U.S. patents are incorporated herein by reference.

BACKGROUND OF THE INVENTION

This invention relates to an improvement in a free standing apparatus for measuring heat flow from a surface The improvement resides in the use of a second infrared pyrometer for measuring surrounding atmospheric temperature, in order to increase the accuracy of the total heat loss calculation.

With the cost of energy continuing to rise, and with resources for the production of energy getting scarcer by the minute, heat loss has become a major concern for the industrial world, as well as for individuals. As a result, much research and development has been done over the past few years in the study of detecting and measuring heat loss.

In detecting and measuring heat loss, it is sometimes necessary to take heat flux readings from a specified point. One device used in the collection offlux readings is a portable heat fluxmeter fixture described in U.S. Pat. No. 4,589,781. The device of U.S. Pat. No. 4,589,781 is used in processes for heat loss surveys and quantifying heat loss from surfaces. The device of U.S. Pat. No. 4,589,781 consists of a hand held portable fixture with a handle suitable to be grasped and held by an operator. On the device, there is a constant force spring which resists the application of the device so that the force being applied to the test surface is approximately the same each time it is used. With a thermal fluxmeter being attached to one end of this device, a heat flux reading is obtained from the fluxmeter. The heat flux reading is then used as a key parameter in data reduction in a heat loss survey method.

The portable heat fluxmeter fixture of U.S. Pat. No. 4,589,781 has functioned quite accurately when applied to industrial process surfaces, where surface temperatures are relatively high in comparison to "ambient." However, the potential for error increases when the technology is applied to low temperature surfaces, like buildings.

For example, when using the portable heat fluxmeter fixture of U.S. Pat. No. 4,589,781 on low temperature surfaces, it has been discovered that the body temperature of a fluxmeter operator affects results. When the body temperature of the operator is higher than the surface the operator is standing next to, testing measured heat flow patterns reveal that heat flow decreases (sometimes actually reverses) through the region where the heat flow is measured. Therefore, it is difficult to get consistent fluxmeter readings on low temperature surfaces.

A means for applying a constant force to the fluxmeter of U.S. Pat. No. 4,589,781 which is necessary for accurate and repeatable readings is imperfect because a load is not always repeatable due to friction hysteresis. This problem is complicated by the fact that no means is provided for actually measuring the load.

It is desirable to provide a fluxmeter support which contains a reduced cross-section of the legs in order to minimize disturbances to air flows over the surface of the fluxmeter which, in turn, better simulates "normal" or unmetered conditions. It is also desirable to provide a fluxmeter with reduced thermal conductivity of the legs. Besides helping to minimize the inducement of unnatural heat flows which adversely effects accuracy, low conductivity and small cross-section legs would help heat flows to stabilize more quickly, allowing accurate measurements to begin soon after the fluxmeter is applied to the surface.

Even with the small fluxmeters normally employed, loads as high as fifteen pounds may be required for good accuracy. Fluxmeters heretofore have required an operator to manually maintain this load for more than a minute resulting in muscle fatigue and other discomforts which often cause errors through shaking or movement of the fixture which, in turn, causes the load and/or contact area to vary.

A problem associated with heat loss survey methods employing pyrometers is that contact surface pyrometers often provide erroneous data. Since an accurate spot sample of surface temperature of a target is as important as accurate fluxmeter readings, it is desirable to improve this parameter as well.

It is also desirable to compare surface temperature of a target, relative to that of a surrounding atmosphere in heat loss surveys, conducted according to the heat loss survey described in U.S. Pat. No. 4,896,281, thus enabling theoretical surface heat losses to be used for scaling heat losses at sites remote from the fluxmeter. Accurate measurement of the surrounding atmospheric temperature, separate and distinct from measurement of the surface temperature, is thus an important parameter in calculating total heat loss.

Also, manually holding a portable fluxmeter such as described in U.S. Pat. No. 4,589,781 next to a surface being tested, has a drawback in that, if a test surface generates an unbearable temperature, an operator may not be able to withstand the temperature for a long enough period of time to get a good fluxmeter reading.

Therefore, in some instances, the portable fluxmeter fixture of U.S. Pat. No. 4,589,781 is inapplicable. Furthermore, the test site may contain hazards other than heat—noise, for example—which may make extended human presence uncomfortable or dangerous.

In addition, when using the fluxmeter fixture of U.S. Pat. No. 4,589,781, it is difficult and almost impossible to access some surfaces in order to take a fluxmeter reading. Sometimes an operator is too short, and in other cases an operator cannot squeeze into a small opening in order to get close enough to take a reading.

In heat loss survey methods using hardware such as described in U.S. Pat. No. 4,589,781, it is found that accuracy suffers when the technology is applied in situations where there is a very small temperature difference between the measured surface and the surroundings.

Therefore, it is desired to provide an apparatus which alleviates much of the error in these low temperature difference applications. The apparatus is useful in any case where accurate heat fluxmeter readings are required, where there are only small temperature differences between the surface and the surroundings, and where a permanently mounted fluxmeter is not desirable.

SUMMARY OF THE INVENTION

The present invention is directed to an improved apparatus for measuring heat flow from a surface, comprising:
 a. a means for measuring heat flow from a surface;
 b. a means for contacting the heat flow measuring means to the surface;
 c. a means for applying a relatively constant and repeatable force on the heat flow measuring means in contact with the surface;
 d. instrumentation means remote from a test site, for monitoring and reading an applied force;
 e. a first infrared pyrometer for measuring surface temperature;
 f. a second infrared pyrometer for measuring surounding atmospheric temperature; and
 g. a free standing support means for supporting elements a, b, c, d, e and f.

An advantage of the apparatus of the present invention is that the apparatus, alone, will be able to hold a heat fluxmeter in place without an operator having to hold the apparatus in place manually. The operator will simply have to adjust the apparatus so that the fluxmeter is in contact with the surface that is to be tested. Then the operator can quickly set a force to be exerted on a test surface by adjusting either the angle of a ratchet, or the position of a weight on the ratchet handle as shown in FIG. 1. By having these two adjustments, the operator will be able to select a force to be maintained on the test surface.

Furthermore, accurate adjustment will be facilitated by incorporating into the apparatus a load cell in the shaft of the apparatus which will provide an indication of the applied load to the heat measuring means of the apparatus. After a desired force is obtained, the operator can step away from the apparatus and control the data collection process from a more remote site.

With the apparatus of the present invention, the problem of an operator's body temperature affecting the heat flux reading when testing low temperature surfaces is solved, since the operator will not have to stand near the apparatus as it is collecting data.

With the apparatus of the present invention, the problem of applying a constant and known force to a heat flux measuring means is solved. With a load cell inserted in a shaft of the apparatus, an operator will always be able to determine the magnitude of the applied force and to tell if the force is constant. There will be a constant force so long as the apparatus is not moved significantly during the test, since the force is supplied by gravity acting on the adjustable weight on the ratchet.

The apparatus of the present invention contains a fluxmeter structure with a two-leg support which is an advantage over previous four legged fluxmeters. The legs of the present apparatus advantageously utilizes a leg material which is very rigid in compression, and has a relatively low thermal conductivity. This reduces any disturbance the apparatus imposes on the test surface, and thus improves accuracy. Furthermore, the apparatus of the present invention is designed to be "quick-change" on the support apparatus, allowing a variety of fluxmeter structures to be used with one support assembly. In addition, the present invention includes a compact infrared pyrometer which replaces, for example, a surface thermocouple used in the fluxmeter of U.S. Pat. No. 4,589,781 to improve the accuracy of the surface temperature data collected. The present invention also includes an infrared pyrometer to measure surrounding atmospheric temperature, thus improving the accuracy of the total heat loss survey.

All of the aforementioned problem areas have been addressed, and the fluxmeter of the present invention is expected to improve heat flow measurement accuracy and allow measurements in previously intolerable locations.

BRIEF DESCRIPTION OF THE DRAWINGS

When discussing the application and use of the free standing fluxmeter structure or assembly of the present invention, it is necessary to refer to drawings to more clearly describe the invention. Therefore, throughout the remainder of this disclosure, references will be made to the appended drawings wherein like reference numerals refer to like parts in the different figures and in which.

It is to be noted that the appended drawings illustrate only typical embodiments of the invention and are therefore not to be considered limiting of its scope, for the invention may admit to other equally effective embodiments.

DETAILED DESCRIPTION OF THE PREFERRED EMBODIMENTS

Figure 1:
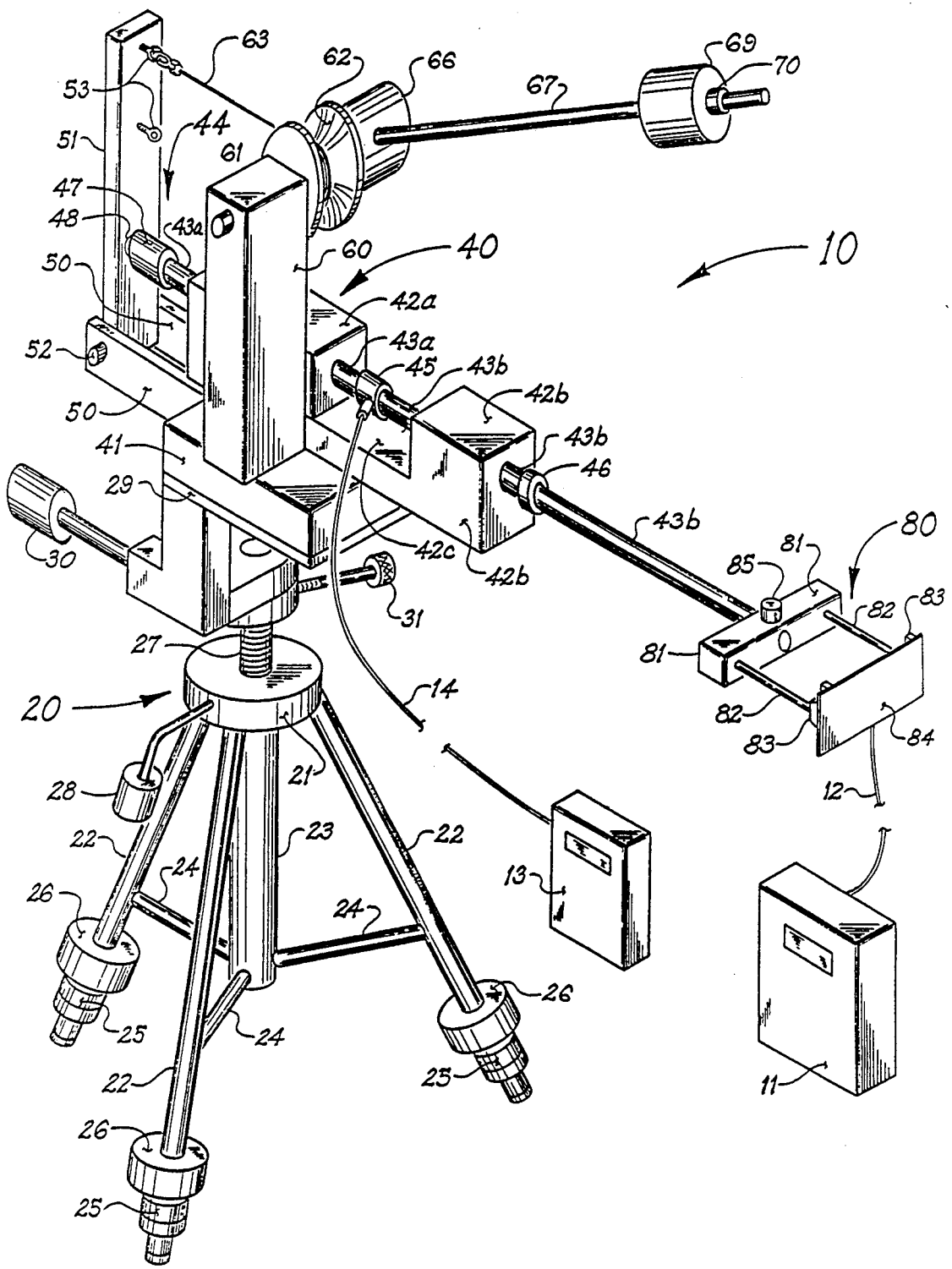
FIG. 1 is an overall pictorial of one embodiment of the free standing fluxmeter fixture of the present invention.

With reference to FIG. 1, there is shown a free standing fluxmeter structure or fixture of the present invention, generally indicated by numeral 10. The free standing fluxmeter fixture 10, herein referred to as fluxmeter fixture 10, comprises a support base portion generally indicated by numeral 20 with a pressure or load applying means, generally indicated by numeral 40 which is used to apply a force against a means for measuring heat flow from a surface, the heat flow measuring means indicated generally by numeral 80.

The base support 20 can be, for example, any high quality "off the shelf" or conventional camera tripod structure including circular base portion 21 with adjustable toggle legs 22 with supporting center tube 23 and rods 24. A means 25 for adjusting the height of the legs 22 to a desired height may be included in the support base 20.

In some instances, the distance of the load applying means 40 and other accessories mounted on the tripod 20 may be off centered from the center of the tripod 20 and thus, the tripod 20 with its accessories may tend to tip. Therefore, in some positions additional weights 26 will have to be added to the tripod legs 22. By adding the proper amount of weights 26, the tipping tendency will be counteracted. Since the additional weights 26 will make the fluxmeter fixture 10 more awkward and harder to carry around, any added accessories to the fluxmeter fixture 10 should be attached only when required.

If, by adjusting the toggle legs 22 the height adjustment of the fluxmeter fixture 10 is not enough, a threaded shaft 27 in center tube 23 and handle 28 of the tripod 20 may be used to adjust the height of the fluxmeter fixture 10 even more. By turning the handle 28, the shaft 27 will either raise or lower a pan head platform 29 mounted thereto.

In addition to being able to adjust the height of the tripod 20, the angle of the platform 29 with respect to the ground can also be adjusted. This can be done by loosening handle 30 of the tripod 20, rotating the platform 29 about a primary axis and tightening handle 30 when the platform is in a desired position. Furthermore, the orientation of the fluxmeter device 10 can also be changed by loosening handle 31 of the tripod 20, rotating the device about a second primary axis and tightening handle 31 when the device is in a desired position.

Removably mounted to the pan head platform 29 is the means for applying a load 40 to the heat flow measuring means 80. The load applying means 40 includes a support base member 41 removably attached to the platform 29. For example, in this instance a rectangular support base plate 41 is attached to the platform 29 with two bolts for supporting the remainder of the fluxmeter fixture 10. To the support base plate 41 is attached, for example by welding, a sleeve 42 for rotatably mounting therein a shaft 43. The shaft 43, in this instance, preferably comprises at least a first shaft section 43a and a second shaft section 43b.

The sleeve 42, in this instance, is a guide block having a first section 42a and a second section 42b integral with a third section 42c forming a notch or space between sections 43a and 452b for attaching a load cell 45 to shaft 43. A ball bearing 44 comprising a removably mounted ball 48 in a threaded shaft end section 47 is removably mounted to one end of the shaft 43 and the heat flow measuring means 80 is removably mounted to the other end of the shaft 43. The load cell 45 is mounted to shaft sections 43a and 43b within the space between first and second sections, 42a and 42b, of the sleeve 42. A washer member 46 is mounted in the shaft section 43b on one side of the second sleeve section 42b.

Also attached to the support base plate 41, for example by welding, are lever arm holder plates 50 for holding a lever arm 51. The lever arm holders 50 and lever arm 51 both have a hole therethrough on one end so that a fastening means such as pin 52 can be inserted therethrough to removably mount the lever arm 51 to the lever arm holders 50. The holes in the lever arm 51 and holders 50 are machined smooth so that the friction between these three pieces and the pin 52 is minimized. The pin 52 also has a smooth finish. Preferably the lever arm 51 contains two pins 53 for attaching a wire or cord 63 thereto.

Also attached to the support base plate 41, for example by welding, is a load crank support 60. The load crank support 60 may also be attached to the sleeve 42. For example, the load crank support 60 may be welded both to the sleeve 42 and to the support base plate 41. Near the top of the load crank support 60 is a hole for receiving a removable rotatable rod such as a shoulder bolt 61. The bolt 61 is inserted through the hole, and is free to rotate. The rotatable bolt 61 supports a pulley means 62 more clearly shown in FIG. 2.

Figure 2:
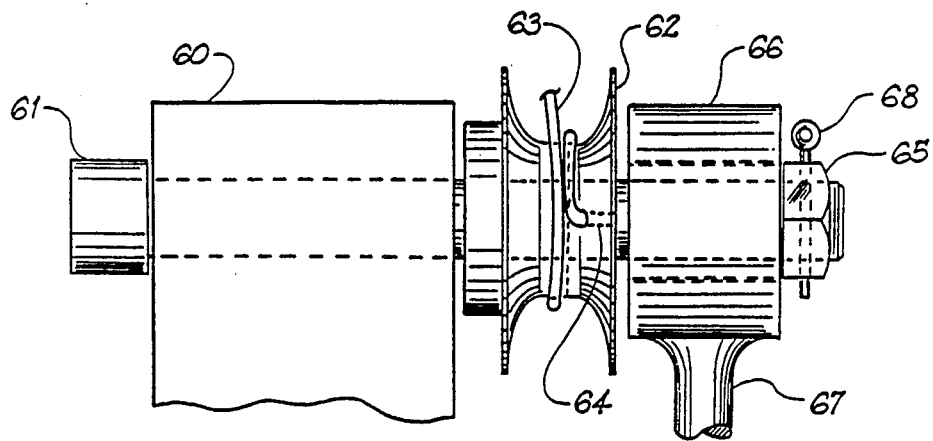
FIG. 2 is a side portion view of the pressure applying means of the present invention.

In FIG. 2 there is shown the pulley 62 which acts as the load crank attached to the shoulder bolt 61. The pulley 62 is removably attached to the shoulder bolt 61, by conventional means, for example, by drilling a hole through both the center of the pulley 62 and the shoulder bolt 61 and inserting fastener such as a roll pin through these two holes (not shown). By attaching the pulley 62 to the bolt 61 in this manner, the pulley 62 rotates along with the shoulder bolt 61.

A wire or cord 63 is removably attached to pulley 62, for example, by drilling a hole 64 in pulley 62 for receiving one end of the cord 63 and fastening the end of the cord 63 therein. The other end of the cord 63 is removably attached to the lever arm 51. Preferably, the lever arm 51 has two pins 53 secured to the lever arm 51 and the wire or cord 63 is removably attached to either of these pins 53. The cord 63 attached to the lever arm 51 is used for connecting the lever arm 51 to the pulley 62 and actuating the lever arm 51 by winding or unwinding the cord 63 around the pulley 62. The aforementioned connection also, advantageously, allows the cord 63 to be changed to either of the two positions of pins 53 on the lever arm 51 quickly and easily. The two positions of connecting the pulley 62 to the lever arm 51 are desired to apply a force on substantially all possible angles that the fluxmeter heat flow measuring means 80 may be positioned.

Preferably, the shoulder bolt 61 contains a threaded portion at one end of the shoulder bolt 61 and screwed onto the threaded portion is a coupling nut 65. A ratchet head 66 with a handle 67 is removably attached to the nut 65. Preferably the ratchet head 66 is placed on the coupling nut 65 and a pin 68 is placed through a hole on the end of the shoulder bolt 61 and the coupling nut 65 in order to keep the ratchet 66 from falling off. The hole is drilled through the end of the coupling nut 65, so that the pin 68 can be removably inserted therethrough.

The handle 67 is attached to the ratchet head 66, for example, by welding. Preferably, the handle 67 is round and the finish on this handle is smooth, so that a weight 69 (shown in FIG. 1) slidably mounted on the handle 67 can be adjusted easily to different locations along the handle 67. The weight 69 is held in place by a fastener 70 (shown in FIG. 1) such as a threaded nut which is easily loosened and tightened for sliding the weight 69 along the handle 67. Once the weight 69 is in a desired position it is fixed in position by the fastener 70.

Figure 3:
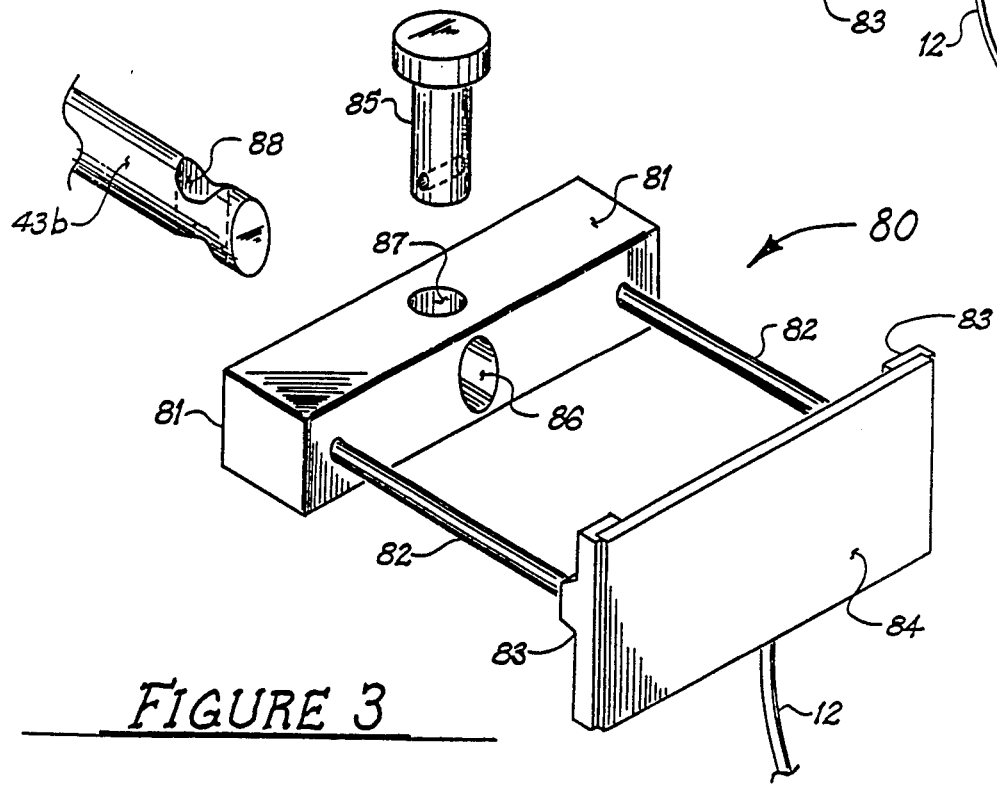
FIG. 3 is a perspective portion, partially exploded view showing a removable heat measuring means of the present invention.

With reference to FIG. 3, there is shown a heat flow measuring device or fluxmeter structure, generally indicated by numeral 80, removably mounted to the shaft 43. The fluxmeter structure 80 comprises a fluxmeter support 81 with rod members 82 attached to fluxmeter fitting 83. A heat fluxmeter plate 84 is attached to the fittings 83 by any conventional means such as by using an adhesive such as thermal paste. The fluxmeter plate 84 is in electrical communication with a data collection means 11 by means of a communication line 12. The fluxmeter plate 84 can be any suitable heat flow measuring transducer (also referred to as heat flux transducer (HFT)) known to those skilled in the art such as a rigid or flexible thermopile type, a high temperature bi-metallic type, or a film type transducer. An example of a transducer used in the present invention is described in U.S. Pat. No. 1,528,383.

Preferably, the two thin rods 82 are attached to the fluxmeter support 81 by an adhesive such as epoxy. It is preferred that the two rods 82 be made of materials which are low in thermal conductivity and high in resistance to buckling. The rods 82 can be made of, for example, Hastalloy ® C, beryllium, ceramic metals such as tungsten carbide, high strength composite materials such as graphite epoxies. Attached to the ends of these two rods are two small, thin fluxmeter fittings 83, connected to the fluxmeter plate 84 are attached, for example, by welding to the rods 82.

The fluxmeter structure 80 is preferably removably mounted to shaft 43. For example, the shaft 43 slides through a bore 86 in the fluxmeter support 81 and a pin 85 to be quickly fitted or removed through concentric holes 87 and 88 through fluxmeter support 81 and shaft 43, respectively. This mounting assembly of the structure 80 allows a single free standing support base 20 and load applying means 40 to serve several different types of fluxmeter structures 80 and provides a means for rapid change over of structures 80 in field conditions.

Figure 7:
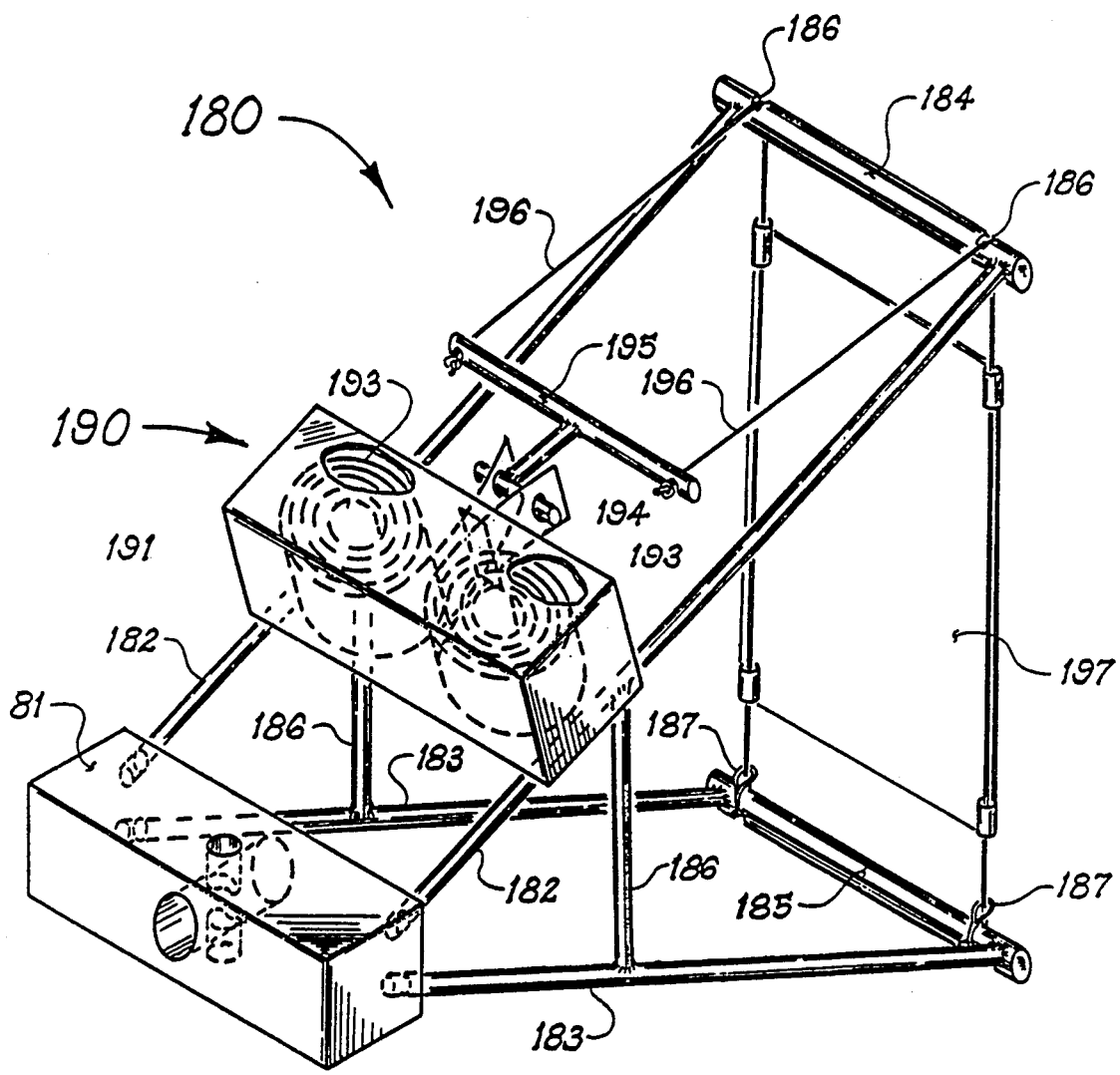
FIG. 7 is an alternate embodiment of a heat fluxmeter structure of the present invention.

For example, another fluxmeter structure which may be used in the present invention is shown in FIG. 7. With reference to FIG. 7, there is shown a fluxmeter structure 180 including a fluxmeter support 81 which may be removably mounted to shaft 43 with a pin 85 through bores 86 and 87 (not shown). To the support 181 is attached a pair of top rods 182 arranged in parallel manner to each other and a pair of bottom rods 183 arranged in parallel manner to each other. The rods 182 and 183 are attached to support 81 spaced apart at angle to each other. A traverse bar member 184 is attached normal to rods 182 and a traverse bar member 185 is attached normal to rods 183. Support traverse bar members 186 are attached to each pair of rods 182 and 183 respectively.

A spring tension mechanism 190 is attached to the top rods 182 which includes a housing 191 of any configuration, in this instance a rectangular box. The housing 192 contains two springs 193 for applying a constant tension on cable lines 196. Passing through a slot or window (not shown) of the housing 191, the springs 193 are removably attached to a draw bar 195 via an attachment bar 194. Cable lines 196 are attached to a draw bar 195 to the two ends of the draw bar 195 and continue adjacent to traverse bar 184 which fit in notches 186 of traverse bar 184 and then cables 196 are attached around notch 187 in traverse bar 185. The cables 195 are used to hold a flexible heat fluxmeter plate 197 in substantially constant tension. The fluxmeter structure 180 is useful for measuring heat flow of structures having curved surfaces, for example, pipes' drums and pressure vessels. Spring extension and retraction occurs smoothly so the cables and flexible fluxmeter "wrap around" the curved surface.

With reference to FIG. 1, again, the ball bearing 44 mounted to shaft section 43a is free to rotate in all directions, allowing a linear force transfer between the lever arm 51 and shaft 43. The ball bearing 44 comprises a threaded section 47 on the end opposite a rotating ball 48 which is screwed into the shaft section 43a. The shaft section 43b extends through the first section 42a of the sleeve 42 and connects to the load cell 45. The shaft 43 extends through the second section 42b of the sleeve 42. The washer 46 is mounted on shaft 43 on one side of sleeve section 42b to aid in protecting the load cell 45 when an excessive force is applied against the fluxmeter structure 80. The load cell 45 is connected to the shaft sections 43a and 43b by threading, for example, female threads machined into the shaft sections 43a and 43b are preferably matched to male threaded studs of the load cell 45. The shaft 43 with ball bearing 44 and load cell 45 is free to slide in the direction of the axis of shaft 43 in sleeve 42.

The load cell 45 is, preferably, a small strain gauge based device which measures the force that is being applied from the fluxmeter plate 84 to the test surface. The type of load cell suitably used in the present invention can be, for example, a Model 31 load cell manufactured by Sensotec, Inc. of Columbus, Ohio. Alternatively, any conventional device for measuring mechanical force, for example a spring scale, could be substituted for the load cell 45. The load cell 45 is connected along the line of force with threaded studs (not shown) that extend out of the load cell on both sides of the load cell's metering section (not shown). The readings gathered by the load cell 45 are sent to an indicator 13 in electrical communication with the load cell with communication line 14. The indicator 13 provides a digital indication of force, for example in pounds, applied to the surface in contact with the fluxmeter plate 84. The indicator 13 is also available from Sensotec, Inc.

The separated bearing surfaces of shaft sections 43a and 43b in sleeve sections 42a and 42b serves to assure that both application and measurement of load is confined to a line normal (perpendicular) to the test surface which, in turn, assures load measurement accuracy and provides the best interface between the fluxmeter plate 84 and the test surface. Another function of this arrangement is to protect the load cell 45 from potentially damaging side loads.

Using the above embodiment of the present invention, the magnitude of the force being exerted on the test surface from the fluxmeter plate 84 can be changed by adjusting the position of the weight 69 on the handle 67. If a greater force is wanted, then the weight 69 will need to be moved farther from the ratchet head 66. On the other hand, if a lesser force is wanted, then the weight 69 will need to be moved closer to the ratchet head 66. In addition to the above method of adjusting the force, the force can be changed by adjusting the angle of the handle 67 with respect to the ground. This can be done by rotating the ratchet head 66 to the desired position. The more parallel the handle 67 is to the ground, the more force will be exerted on the test surface by the fluxmeter plate 84. Conversely, the more perpendicular the handle 67 is with the ground, the less force will be exerted. Small changes of force can be obtained by using either of the above two means of adjusting the force.

With the ratchet head 66 and the pulley 62 connected to the shoulder bolt 61, gravity acting on the weight 69 will cause the cord 63 to tighten and pull the lever arm 51 toward the pulley 62. This, in turn, will cause the lever arm 51 to push the ball bearing 44, which is connected along the line of the shafts 43, toward the test surface. Thus, a perpendicular force is generated coupling the fluxmeter plate 84 to the test surface.

Figure 4:
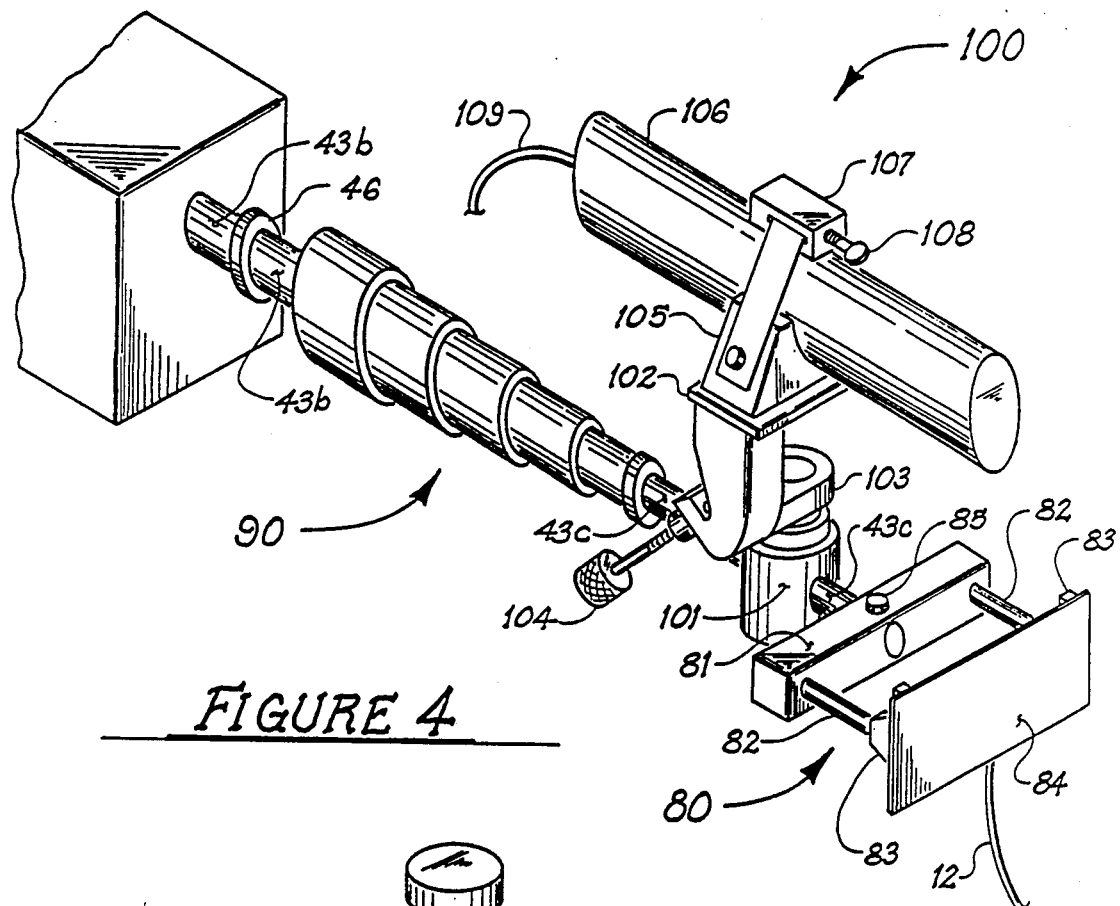
FIG. 4 is a perspective portion view showing an alternate embodiment of the freestanding fluxmeter fixture of the present invention.

In order for the fluxmeter plate 84 to touch a test surface, either the whole fluxmeter structure 10 can be moved closer or further from the test surface, or as an alternate embodiment a telescoping extension 90 as shown in FIG. 4 can be mounted to the shaft 43. For example, the extension 90 can be installed in a portion of the shaft 43b after the washer 46. One end of the telescopic extension 90 can be screwed onto the shaft portion 43ab and a shaft portion 43c can be screwed onto the other end of the telescopic extension 90.

When the telescopic extension 90 is installed, the reach of the fluxmeter plate 84 is extended by a predetermined minimum distance with the telescope collapsed. The reach can further be increased to a predetermined distance with the telescope extended. Along with the height variability of the tripod 20 and the angular variability of the platform 29, the telescopic section 90 will help to provide a high degree of freedom for positioning the fluxmeter plate 84.

With reference to FIG. 4, again, there is shown a conventional pyrometer and pyrometer assembly, generally indicated by numeral 100 mounted to the fluxmeter fixture 10. The pyrometer assembly is an optional assembly and alternate embodiment of the present invention.

The pyrometer assembly 100 includes, for example, a piece 101 annularly mounted to shaft 43 which is telescoped over the shaft 43 and which is preferably fixed by pinning in place. A small tripod head or platform 102 which has the same adjustability as the platform 29 discussed previously, except that its height may not be adjusted, is mounted to the piece 101. The platform 102 may be adjusted by rotatably mounted piece 103 and handle 104 attached to piece 101.

Mounted onto the small tripod platform 102, for example by screw means, is a pyrometer holder 105 which is contoured to the shape of a pyrometer 106 mounted thereto. Then, a clamp means 107 is attached to the pyrometer holder 105 with a screw 108 on both sides of the holder. The pyrometer 106 is placed in this seat and tightened down with the clamp means 107. The pyrometer 106 is in electrical communication via line 109 to a data collection means such as data collector 11 (shown in FIG. 1).

With the pyrometer 106 fastened to the small tripod head 102, the pyrometer 106 can be adjusted to point at the spot where a temperature reading is desired. This adjustment can be made with a tripod head 102, piece 103 and handle 104. With the pyrometer 106 positioned to give a temperature reading of the surface in contact with the fluxmeter plate 84, the accuracy of heat flux readings is improved.

Figure 8:
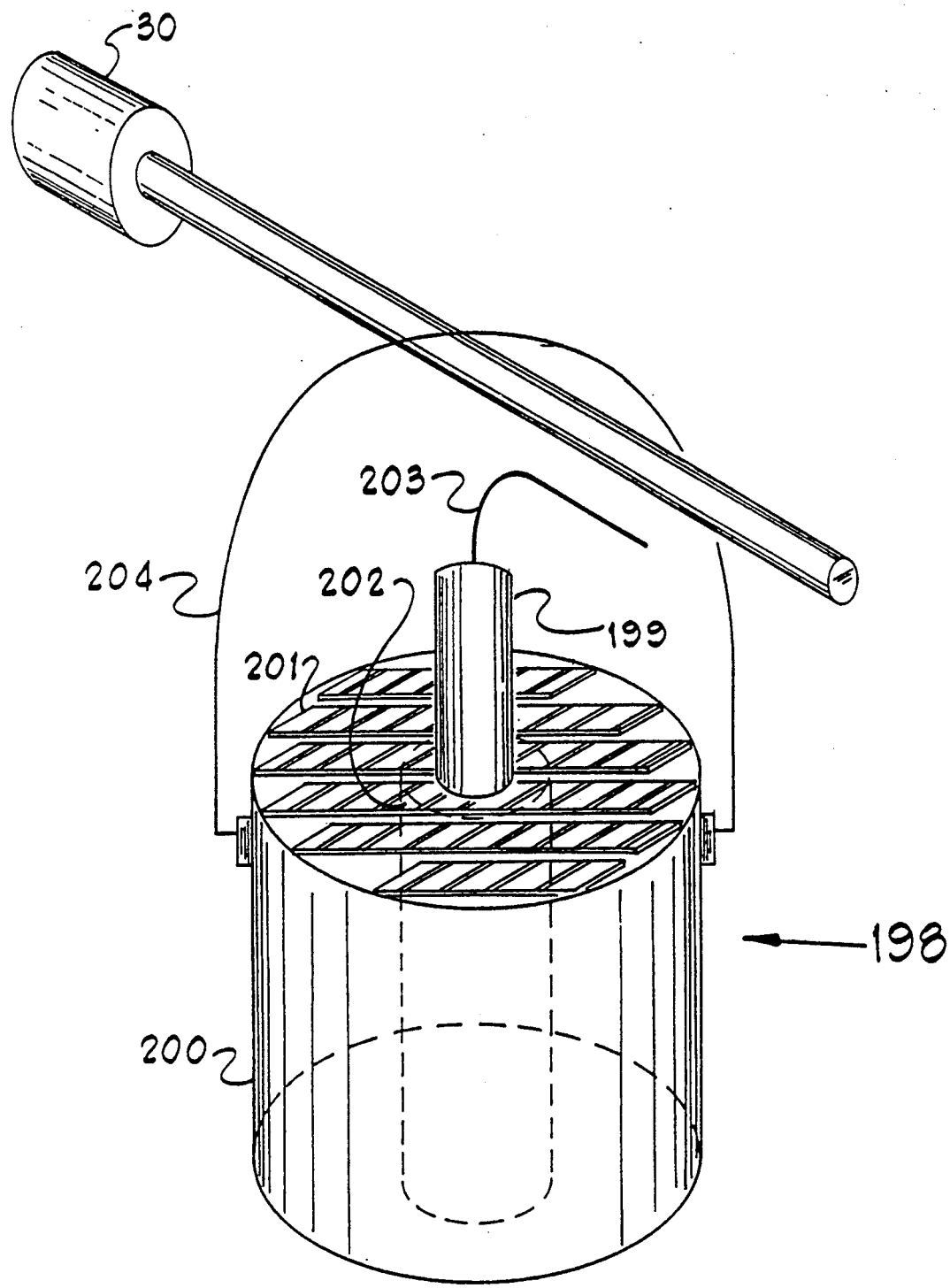
FIG. 8 is a perspective portion view showing yet another alternate embodiment of the freestanding fluxmeter fixture of the present invention, including an atmospheric temperature pyrometer having a target and radiation shielding.

To obtain surrounding atmospheric temperature, an additional pyrometer installed on a thermally isolated reference device 198 and attached to a portion of a free standing support means is shown in FIG. 8. The additional pyrometer can be fixedly or removably attached to the free standing support means. Means for removably attaching this additional pyrometer to the tightening handle 30 is shown, for example, by a wire 204. An open-ended container 200 contains a concentrically mounted open-ended container 202. These containers are connected by radially oriented fastening means (not shown). A conventional pyrometer 199 is aimed at a low mass black target (not shown) suspended in the bottom of the inner most container 202, to which the pyrometer is also attached. Louvers 201 are mounted over the top and bottom of both the inner and outer containers 202 and 200, respectively. Surrounding atmospheric air can pass through these louvers enabling convective heat transfer to the low mass black target, which is suspended inside of container 202 and isolated from thermal radiation. The pyrometer 199 measures the temperature of the low mass black target and is in electrical communication via line 203 to a data collection means, such as data collector 11 (shown in FIG. 1).

Figure 5:
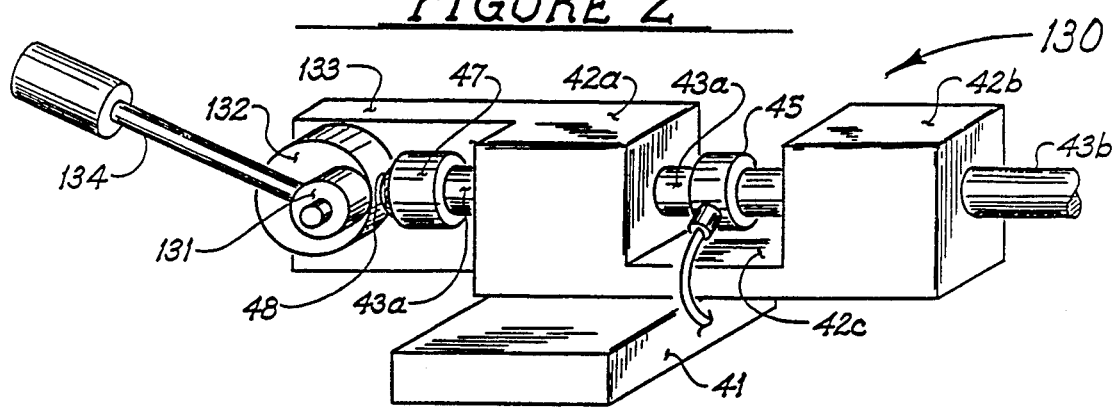
FIG. 5 is a perspective portion view showing an alternate embodiment of the pressure applying means of the present invention.

With reference to FIG. 5, there is shown another embodiment of a force or load applying means 130 useful in the present invention wherein a force is generated with the same type of ratchet and sliding weight concept as load applying means 40 as described above, but the lever arm 51 and cord 63 have been done away with in the embodiment shown in FIG. 5. The load applying means 130 includes a ratchet head 131 attached off center of a circular disk 132 rotatably mounted to the side of sleeve extension plate 133 with integral sleeve section 42a. The ratchet head 131 is positioned on the circular disk 132 so that it is in contact with ball bearing 44 which is in line with a shaft 43 of the fluxmeter structure (not shown). By attaching the ratchet head 131 off center of the circular disk 132, the disk 132 will act as a cam and push the ball bearing 44 towards the test surface by movement of a handle 134 and, thus, exerting a force from the fluxmeter plate (not shown) to the test surface. The adjustment of the force can be changed in the same way as in the aforementioned embodiment shown in FIG. 1.

Figure 6:
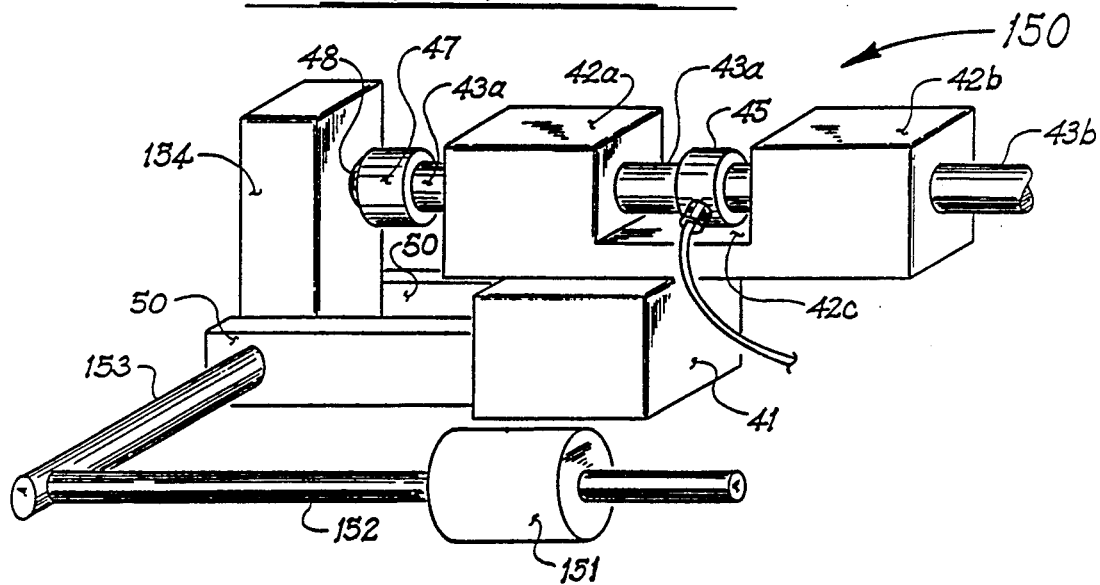
FIG. 6 is a perspective portion view of another embodiment of the pressure applying means of the present invention.

Another embodiment of a force or load applying means 150 useful in the present invention is shown in FIG. 6. In this embodiment, a force is supplied by an adjustable weight 151 which is slidably mounted to a handle 152. The handle 152 is connected to a bar 153. The bar 153 acts as both a load crank and a pivot for a lever arm 154. The bar 153 rotates freely in the two lever arm holders 50 and the lever arm 154 is pinned to bar 153. Therefore, the weight 151 on handle 152 will cause the lever arm 154 to push the ball bearing 44 toward the test surface, thus supplying the force from the fluxmeter plate (not shown) to the test surface. A ratchet head and handle means (not shown) may be substituted for handle 152 to adjust the handle 152 at different angles with respect to the bar 153. The ratchet head and handle means of load applying means 150 may be substantially similar to ratchet head 66 and handle 67 shown in FIG. 1.

Other possible alternative force or load applying systems useful in the present invention include, for example, different weight/gravity designs, spring arrangements, hydraulic or pneumatic power systems, and the like.

The free standing fluxmeter structure of the present invention is used, for example, in heat loss survey processes wherein heat flow measurements are needed. The structure is useful, for example, for measuring heat flow from surfaces of buildings and chemical production plant equipment.

What is claimed is:
1. An apparatus for measuring heat flow from a surface comprising:
 a. a means for measuring heat flow from a surface;
 b. a means for contacting the heat flow measuring means to the surface;
 c. a means for applying a relatively constant and repeatable force on the heat flow measuring means in contact with the surface;
 d. instrumentation means remote from a test site for monitoring and reading an applied force;

e. a first infrared pyrometer for measuring the surface temperature;

f. a second infrared pyrometer for measuring surrounding atmospheric temperature; and g. a free standing support means for supporting elements a, b, c, d, e and f.

2. The apparatus of claim 1 including a means for aiming said first pyrometer at a particular point on said surface.

3. The apparatus of claim 2 wherein the means for aiming said first pyrometer consists of a camera type pan head mechanism.

4. The apparatus of claim 1 including a means for attaching said second pyrometer to said free standing support means.

5. The apparatus of claim 1 including an instrumentation means for recording said applied force remote from said test site.

6. The apparatus of claim 1 including instrumentation means for monitoring and reading heat flow data remote from said test site.

7. The apparatus of claim 1 including instrumentation means for recording heat flow data remote from said test site.

8. The apparatus of claim 1 wherein the heat flow measuring means is a heat flow measurement transducer.

9. The apparatus of claim 8 including a means for fitting the transducer to the free standing support means to provide force transfer between the support means and transducer without substantially altering heat transfer at said surface.

10. The apparatus of claim 9 wherein the means of fitting the heat flow transducer comprises two thin legs with thin support channels for the heat flow measurement transducer.

11. The apparatus of claim 8 wherein said free standing support means includes at least one fixture for adjusting the angular orientation of the heat flow measurement means.

12. The apparatus of claim 11 wherein said free standing support means includes a means for adjusting the height of the heat flow measurement transducer.

13. The apparatus of claim 11 wherein said free standing support means includes a means for adjusting the reach of extension of the heat flow measurement transducer away from a central vertical axis of the free standing support means.

14. The apparatus of claim 11 including a means for interchanging heat flow measurement transducers on the free standing support means to interchangeably utilize one free standing support means with a variety of heat flow measurement transducers.

15. The apparatus of claim 11 wherein the heat flow measurement transducer comprises a thermopile-type thermal fluxmeter.

16. The apparatus of claim 1 wherein the free standing support means comprises a camera-type tripod.

17. The apparatus of claim 11 including a mass means for applying gravitational force thereon such that a force is applied through the heat flow transducer to said surface.

18. The apparatus of claim 5 wherein said instrumentation means includes a computerized data collection device for recording data.

19. The apparatus of claim 1 including a strain gauge type load cell for measuring applied force.

20. The apparatus of claim 11 wherein adjustment of the angular orientation of the heat flow measurement transducer automatically adjusts the angle of the applied force.

21. The apparatus of claim 11 wherein said fixture comprises a camera mount type pan head mechanism.

22. The apparatus of claim 12 wherein the means for adjusting the height comprises a camera tripod type elevator mechanism.

23. The apparatus of claim 13 wherein the means for adjusting the reach of extension comprises a tubular telescoping section.

24. The apparatus of claim 17 wherein the mass means includes a means for translating gravitational force into torsional force on a shaft.

25. The apparatus of claim 24 including a means for adjusting the magnitude of the torsional force by moving the mass radially on a handle.

26. The apparatus of claim 24 including a ratchet mechanism for translating force to the shaft.

27. The apparatus of claim 24 including a crank and cable arrangement means for translating force from a lever means to the shaft.

28. The apparatus of claim 27 wherein said crank and cable arrangement means comprises a pulley.

* * * * *